United States Patent

Morii et al.

[11] Patent Number: 5,906,693
[45] Date of Patent: May 25, 1999

[54] PNEUMATIC RADIAL TIRE WITH SPECIFIED ORGANIC FIBER CARCASS CORDS

[75] Inventors: Takao Morii; Yasuyuki Tamura, both of Kodaira, Japan

[73] Assignee: Bridgestone Corporation, Tokyo, Japan

[21] Appl. No.: 08/672,260

[22] Filed: Jun. 26, 1996

[30] Foreign Application Priority Data

| Jun. 28, 1995 | [JP] | Japan | 7-162014 |
| Jun. 28, 1995 | [JP] | Japan | 7-162015 |
| Jun. 28, 1995 | [JP] | Japan | 7-162701 |
| Aug. 24, 1995 | [JP] | Japan | 7-215773 |
| Aug. 24, 1995 | [JP] | Japan | 7-215774 |
| Jun. 19, 1996 | [JP] | Japan | 8-177214 |

[51] Int. Cl.$^6$ ............... B60C 3/00; B60C 9/04; B60C 9/08; D02G 3/48
[52] U.S. Cl. ............ 152/454; 152/548; 152/556; 152/564; 428/364; 428/375; 428/392; 428/394; 428/395
[58] Field of Search ............... 152/556, 451, 152/548, 454, 564; 57/902; 428/375, 364, 394, 395, 392

[56] References Cited

U.S. PATENT DOCUMENTS 5,238,039  8/1993  Nakajima .
5,370,169  12/1994  Nakajima .

FOREIGN PATENT DOCUMENTS

| 0 209 167 A1 | 1/1987 | European Pat. Off. . |
| 0 522 529 A1 | 1/1993 | European Pat. Off. . |
| 0 546 859 A2 | 6/1993 | European Pat. Off. . |
| 350001 | 3/1991 | Japan . |
| 3167002 | 7/1991 | Japan . |
| 3227606 | 10/1991 | Japan . |
| 4251730 | 9/1992 | Japan . |
| 4-317802 | 11/1992 | Japan . |
| 516606 | 1/1993 | Japan . |
| 571033 | 3/1993 | Japan . |
| 624208 | 2/1994 | Japan . |
| 6179306 | 6/1994 | Japan . |
| WO 92/12287 | 7/1992 | WIPO . |

Primary Examiner—Adrienne Johnstone
Attorney, Agent, or Firm—Sughrue, Mion, Zinn, Macpeak & Seas, PLLC

[57] ABSTRACT

An organic fiber cord for rubber reinforcement satisfies relationships of $S1 \geq 2.5$, $S2 \leq 1.8$ and $S2 \leq S1-2.0$ wherein S1 and S2 are dry heat shrinkage factors under particular conditions in order to improve the durability and dimensional stability of rubber articles without the degradation of other properties in the rubber article. When such an organic fiber cord is applied to a carcass ply of a pneumatic radial tire, the tire durability and uniformity are considerably improved.

8 Claims, 3 Drawing Sheets

FIG_1

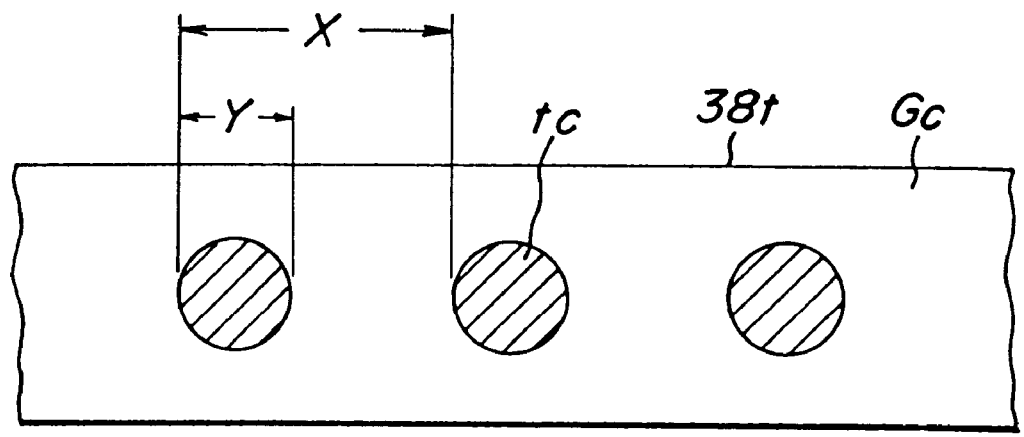
FIG_3

PNEUMATIC RADIAL TIRE WITH SPECIFIED ORGANIC FIBER CARCASS CORDS

BACKGROUND OF THE INVENTION

1. Field of the Invention

This invention relates to an organic fiber cord for rubber reinforcement capable of largely enhancing durability and dimensional stability of rubber articles without exerting upon various properties of the rubber article as well as a pneumatic radial tire using the same as a carcass ply.

2. Description of Related Art

At the present time, the organic fiber cords for rubber reinforcement, particularly fiber cords treated with an adhesive are widely used as a reinforcement for rubber articles such as tires, conveyor belt, V-belt, hoses and the like. As a material of the fiber cord, there are preferably used organic fibers such as rayon fiber, polyamide fiber, polyester fiber, aramide fiber and so on. In order to enhance the performance of a final rubber article, there are used a method of improving properties of rubber material, a method of changing a structure or form of a rubber article and the like, and also it is very important to improve the properties of the fiber cord used for the reinforcement.

Recently, polyester fibers become mainly used as a material for a fiber cord of a carcass ply in a pneumatic radial tire for passenger cars because they are high in the strength and dimensional stability as compared with the conventional rayon fiber and nylon fiber. Furthermore, polyester fibers having a dimensional stability higher than that of the conventional polyester fiber or so-called high modulus and low heat-shrinkable polyester fibers are produced with the advance of high-speed and high-stress spinning technique, which are used as a fiber cord for the carcass ply to attempt the improvement of steering stability and uniformity of radial tires.

Especially, the heat shrinkability of the carcass ply cord is closely related to the deformation of the tire at a high temperature (170–180° C.) applied in the tire building (vulcanization). It is known that as the heat shrinkage factor becomes small, it tends to increase the roundness of the tire and improve the tire uniformity (e.g. JP-A-5-71033, JP-A-6-179304, JP-A-3-167002, JP-A-5-16606, JP-A-6-24208 and the like).

Since the polyester fiber cords mainly used in the carcass ply of the radial tire for the passenger car are high in the strength and dimensional stability as mentioned above, they are effective to improve the steering stability and uniformity of the radial tire. As shown in FIG. 1, however, the radial tire has a general structure that a carcass ply 14 is wound around around each of bead cores 12A, 12B from inside toward outside to form a turnup portion and an end 20A, 20B of the turnup portion is at a freely moving state, so that there are caused the following problems. That is, when the heat shrinkage factor of the cord used in the carcass ply is simply decreased, the self-shrinkage factor of the cord in the turnup portion becomes small, so that the disorder is caused in the arrangement of the cords at the end of the turnup portion in the carcass ply and hence the fatigue resistance of the turnup portion is degraded to largely lower the durability of the tire. On the other hand, when the dry heat shrinkage factor of the cord is simply large, the dimensional stability is degraded to reduce or deform the resulting product. Consequently the roundness is lost and the uniformity is considerably degraded in case of the products attaching importance to the dimensional stability such as tires or the like. In any case, it is difficult to simultaneously establish dimensional stability and durability of the rubber article reinforced with the organic fiber cords only by using the conventional fiber cords for rubber reinforcement treated with the adhesive.

In tires, particularly passenger car tire among the rubber articles, steering stability and ride comfortability are very important among various running performances. The steering stability considerably exerts upon the running performance of the vehicle and becomes occasionally an important property concerning the safeness of the vehicle, while it is needless to say that the ride comfortability is an important property exerting upon the pleasantness of the passengers. In general, when the rigidity of the sidewall portion of the tire is enhanced for the improvement of the steering stability, the ride comfortability is rather lowered. For this end, various research and development for the improvement of these properties are actively carried out watching the carcass ply or cap layer of the tire, but it is said that there is a limit in the simultaneous improvement of these properties because the steering stability and the ride comfortability are so-called conflicting requirements in the construction of the tire. In this connection, it has first been made possible to simultaneously establish the steering stability and the ride comfortability in the same tire by developing a tire having two or more inflection points on its carcass profile line in which centers of curvature of arc are existent outside and inside the carcass profile line as described in U.S. Pat. Nos. 5,238,039 and 5,370,169.

In the tire having centers of curvature located outside and inside the carcass line and two or more inflection points as described in U.S. Pat. Nos. 5,238,039 and 5,370,169, when simple low-shrinkage cords are applied to the carcass ply, the carcass line aimed by the tire designer is obtained in the carcass ply extending between the bead cores, but the properties are disordered in the turnup portion of the carcass ply wound around the bead core toward outside due to the small self-shrinkage of the cord and hence the tire durability may largely be degraded. On the other hand, when simple high-shrinkage cords are applied to the carcass ply, the properties of the cord are sufficiently maintained in the turnup portion, but it is difficult to render the carcass ply extending between the bead cores into the carcass line aimed by the tire designer.

SUMMARY OF THE INVENTION

It is, therefore, an object of the invention to provide organic fiber cords for rubber reinforcement capable of largely enhancing durability and dimensional stability of a rubber article without exerting upon various properties of the rubber article.

It is another object of the invention to provide a pneumatic radial tire having improved uniformity and durability by using the above organic fiber cords in a carcass ply of the tire.

It is another object of the invention to provide a pneumatic radial tire capable of holding the tire durability equal to or more than that of the conventional tire by using the above organic fiber cords in the carcass ply while maintaining a specified carcass profile line aimed by the tire designer for improving the steering stability and ride comfortability.

The inventors have noticed the dry heat shrinkage factor of the organic fiber cord for rubber reinforcement treated with an adhesive, dry heat shrinking force (dry heat shrinkage stress) and force obstructing rubber around the cord in the dry heat shrinkage (restraint force of rubber), which are created during vulcanization in order to solve the above problems, and durability to compression input as a product and made various studies thereto. As a result, it has been clarified that the dimensional change and durability of the rubber article are closely related to any physical properties of the organic fiber cord for rubber reinforcement treated with the adhesive. Also it has been found out that the durability and dimensional stability of the rubber article can largely be enhanced by methods as mentioned later without exerting upon the properties of the rubber article and pneumatic radial tires having improved uniformity and durability as well as steering stability and ride comfortability can be provided by using such organic fiber cords in the carcass ply of the tire.

According to a first aspect of the invention, there is the provision of an organic fiber cord for rubber reinforcement, characterized by satisfying the following relationships (1)–(3):

$$S1 \geq 2.5 \qquad (1)$$

$$S2 \leq 1.8 \qquad (2)$$

$$S2 \leq S1-2.0 \qquad (3)$$

where S1 is a dry heat shrinkage factor (%) at a temperature of 177° C. under a load of 0.03 g/d and S2 is a dry heat shrinkage factor (%) at a temperature of 177° C. under a load of 0.10 g/d.

In preferable embodiments of the first aspect, the organic fiber cord has a middle elongation E at a temperature of 25° C. under a load of 2.25 g/d satisfying the following relationship (4):

$$E \leq 6.0 \qquad (4),$$

and the dry heat shrinkage factor S2 satisfies the following relationship (5):

$$S2 \leq 0.7 \qquad (5),$$

and the organic fiber cord is made from polyester.

In another preferable embodiment of the first aspect, the organic fiber cord is subjected to a treatment with an adhesive under dipping conditions that a temperature of a final normalizing zone is made lower by 40–80° C. than a temperature of a heat set zone and a cord tension in the normalizing zone is ½–⅕ of cord tension in the heat set zone, and further covered with a rubber composition satisfying the following relationship (6):

$$17 \leq M \leq 25 \qquad (6)$$

wherein M is a tensile stress (kgf/cm²) at a temperature of 25° C. under 50% elongation.

According to a second aspect of the invention, there is the provision of a pneumatic radial tire comprising a tread portion, a pair of sidewall portions extending inward from both ends of the tread portion, a pair of bead portions extending from the sidewall portions, a radial carcass comprised of one or more carcass plies toroidally extending between the bead portions in which at least one carcass ply is wound around a bead core embedded in the bead portion from inside of the tire toward outside to form a turnup portion, and a belt superimposed about a crown portion of the carcass and comprised of plural belt layers, characterized in that cords used in the carcass ply are the organic fiber cords defined in the first aspect of the invention.

In a preferable embodiment of the second aspect, the carcass has a carcass profile line at section in a radial direction of the tire made from at least one meandering curved shape selected from consisting of a meandering curved shape having two or more inflection points between an intersecting point (A) of a line segment passing through an end of a maximum width of the belt and perpendicular to a rotating axis of the tire with respect to the carcass profile line and a point (B) existing on the carcass profile line at a position corresponding to a maximum width of the carcass and a meandering curved shape having two or more inflection points between the point (B) and an intersecting point (C) of a line segment passing through a width position of a rim and perpendicular to the rotating axis of the tire when the tire is mounted onto a nominal rim and self-postured by inflating at a standard internal pressure no load.

In another preferable embodiment of the second aspect, the turnup portion of the carcass ply has an occupying ratio α of cord end count satisfying the following relationship (7):

$$0.48 \leq \alpha \leq 0.55 \qquad (7),$$

and the cord used in the carcass ply is covered with a coating rubber satisfying the following relationship (8):

$$17 \leq M \leq 25 \qquad (8)$$

wherein M is a tensile stress (kgf/cm²) at a temperature of 25° C. under 50% elongation.

Moreover, the term "g/d" used herein means a value obtained by dividing a load applied to the cord (grams) by an actually found total denier of the cord (so-called correct size), while the term "dry heat shrinkage factor" means a heat shrinkage factor measured in a dry atmosphere as mentioned later.

BRIEF DESCRIPTION OF THE DRAWINGS

The invention will be described with reference to the accompanying drawings, wherein:

FIG. 3 is an enlargedly partial developed view of an end zone of a turnup portion of a carcass ply.

DESCRIPTION OF THE PREFERRED EMBODIMENTS

Figure 1:
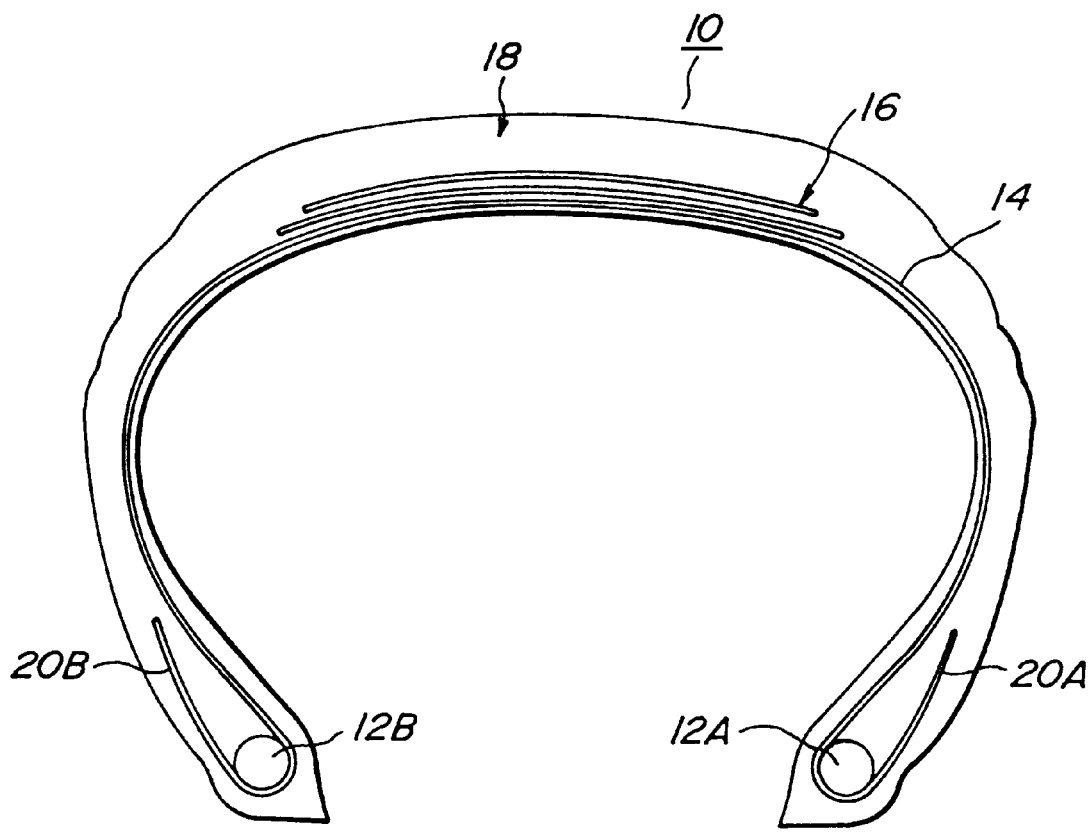
FIG. 1 is a diagrammatically radial section view of a first embodiment of the pneumatic radial tire according to the invention.

In the organic fiber cord according to the invention, use may be made of all materials simultaneously satisfying the relationships (1)–(3) on the two dry heat shrinkage factors under specified temperature and load. As the organic fiber cord, mention may be made of fiber cords of polyesters such as polyethylene terephthalate, polyethylene-2,6-naphthalate and the like; polyamides such as nylon-66, nylon-6, nylon-46, aramide and the like; rayon fiber cord; vinylon fiber cord; and composite fiber cord thereof. Among them, the use of the polyester fiber cord is preferable because the dimensional stability, durability, creep resistance and resistance to flat spot are good. Among the polyester fiber cords, polyethylene terephthalate (PET) fiber cords are favorable because the desired properties may relatively easily be obtained by changing conditions of heat treatment with an adhesive (so-called dipping) in the production step. Moreover, each of these fiber cords usually contains not less than 85 mol % of a respective polymer.

The organic fiber cord for rubber reinforcement according to the invention satisfies the relationships (1)–(3) for the dry heat shrinkage factors S1 and S2 as defined above.

In the tire building through vulcanization, the turnup portion of the carcass ply containing the organic fiber cords reaches to a temperature of 177° C. in the mold, while a load of 0.03 g/d is applied to end regions of the cords in the turnup portion. In the invention, therefore, the dry heat shrinkage factor S1 of the fiber cord is limited to not less than 2.5% as shown in the relationship (1).

When the dry heat shrinkage factor S1 is not less than 2.5%, the slackening of cords created at the turnup end in the formation of a green tire is turned to the original state, whereby the tire durability can be held at a high level while maintaining the good properties of the end region in the turnup portion. On the other hand, when the dry heat shrinkage factor S1 is less than 2.5%, the slackening of the cords is created at the turnup end in the resulting tire product to bring about the scattering in the turnup height of the carcass ply (positions of cord ends in the turnup portion). Since a large input is applied from the rim to the turnup portion during the running of the tire, the scattering of the turnup height and the slackening of cords at the turnup end result in the degradation of the tire durability.

Also, the cords of the carcass ply extending between a pair of bead cores are exposed to a temperature of 177° C. in the tire building through vulcanization and a load of 0.10 g/d is applied to these cords as a restraining force from rubber. In the invention, therefore, the dry heat shrinkage factor S2 of the fiber cord is limited to not more than 1.8% as shown in the relationship (2).

When the dry heat shrinkage factor S2 is not more than 1.8%, the fiber cords of the carcass ply are easy to follow by rubber flow in the mold during the tire building through vulcanization and hence the carcass profile line aimed by a tire designer can easily be formed even if a radius of curvature in the sidewall portion is small. Preferably, the dry heat shrinkage factor S2 is not more than 0.7%.

However, when the dry heat shrinkage factor S2 exceeds 1.8%, the fiber cords of the carcass ply hardly follows by rubber flow in the mold during tire building through vulcanization and hence the carcass profile line aimed by the tire designer can not be formed even if the radius of curvature in the sidewall portion is small. On the other hand, if the dry heat shrinkage factor S2 is below 0%, the fiber cords are stretched under a load of 0.10 g/d and consequently these cords in the carcass ply are meandered between the bead cores in the resulting tire product to cause a problem in the tire quality.

In the invention, when the dry heat shrinkage factors S1 and S2 of the fiber cord satisfy the relationship (3) while satisfying the relationships (1) and (2), the fiber cords in the turnup portion of the carcass ply are first held at a desired state and also the low shrinking of the fiber cords in the carcass ply extending between the bead cores is attained, whereby the tire uniformity can be improved.

The relationships (1)–(3) according to the invention can effectively be attained by subjecting a fiber-stranded cord to a treatment with an adhesive under dipping conditions that a temperature of a final normalizing zone at a dipping step of the fiber-stranded cord is made lower by 40–80° C. than a temperature of a heat set zone and a cord tension in the normalizing zone is ½–⅓ of cord tension in the heat set zone though it is necessary that, for example, raw yarns for the polyester fiber cord are produced by spinning a respective polymer at a relatively low speed and quenching the resulting spy yarn and then drawing at a proper draft.

Furthermore, the organic fiber cord for rubber reinforcement according to the invention is preferable to satisfy the relationship (4) of E≦6.0 as a middle elongation E at an atmosphere temperature of 25° C. under a load of 2.25 g/d. In general, it is known that the middle elongation E is closely related to the dry heat shrinkage factor. As the middle elongation becomes larger, the dry heat shrinkage factor S2 can be lowered and particularly, the uniformity can be improved. However, when the middle elongation E exceeds 6.0%, the modulus of elasticity of the cord is lowered to increase the degree of unevenness in the sidewall portion, whereby the appearance of the tire is degraded.

The term "unevenness of outer surface in the sidewall portion" used herein means a phenomenon that the outer surface of the sidewall portion becomes uneven along a joint portion between longitudinally free ends of the carcass ply due to the difference of rigidity between the joint portion and non-joint portion of the carcass ply. Such an unevenness of the outer surface in the sidewall portion is related to the appearance of the tire, so that it is said that the smaller the degree of the unevenness, the better the appearance. Further, it is known that the degree of unevenness in the sidewall portion is made small as the modulus of elasticity of cord in the carcass ply becomes higher.

The organic fiber cord according to the invention is formed by under-twisting a raw yarn and then top-twisting 2 or 3 twisted yarns in a direction opposite to the under-twisting direction and is preferable to have a twist coefficient (T) of 0.30–0.75 defined by the following equation:

$$T = N \times (0.139 \times D/\rho)^{1/2} \times 10^{-3}$$

wherein N is a twisting number of the cord (times/10 cm), D is an actually found total denier of the cord, and ρ is a specific gravity of the cord. When the twist coefficient is less than 0.30, the durability of the cord is degraded, while when it exceeds 0.75, snarling is caused to bring about the deterioration of the handling.

Furthermore, the organic fiber cords for rubber reinforcement according to the invention are coated with a rubber composition satisfying the relationship (6) of 17≦M≦25 in which M is a tensile stress (kgf/cm$^2$) at a temperature of 25° C. under 50% elongation. When the rubberized fiber cords are used in the carcass ply of the pneumatic radial tire, the durability of the turnup portion of the carcass ply can be improved while utilizing the aforementioned properties of the organic fiber cords according to the invention. When M is less than 17 kgf/cm$^2$, the degree of stress relaxation is small and the effect of improving the durability is insufficient, while when it exceeds 25 kgf/cm$^2$, the rigidity of the turnup portion is too high and the input from the rim to the cords in the turnup end is apt to be concentrated to rather degrade the durability.

The pneumatic radial tire according to the invention will be described below in detail.

FIG. 1 illustrates a first embodiment of the pneumatic radial tire according to the invention. This tire 10 comprises at least one carcass ply 14 extending between a pair of bead cores 12A, 12B and wound around the bead core from inside of the tire toward outside to form a turnup portion 20A, 20B, at least two belt layers 16 superimposed about a crown portion of the carcass ply 14, and a tread portion 18 disposed outside the belt layer 16. The carcass ply 14 contains organic fiber cords arranged at a cord angle of 70–90° with respect to an equatorial plane of the tire. Each of the belt layers 16 contains inextensible cords such as aramide fiber cord or steel cord arranged at a cord angle of 10–30° with respect to the equatorial plane, in which the cords of at least two belt layers are crossed with each other. In this tire, a center of curvature is existent only inside the carcass profile line and also one or more inflection points are existent on the carcass profile line.

According to the invention, the above-defined organic fiber cord is applied to the carcass ply, whereby durability and uniformity are considerably improved as compared with the use of the conventional fiber cords.

Figure 2:
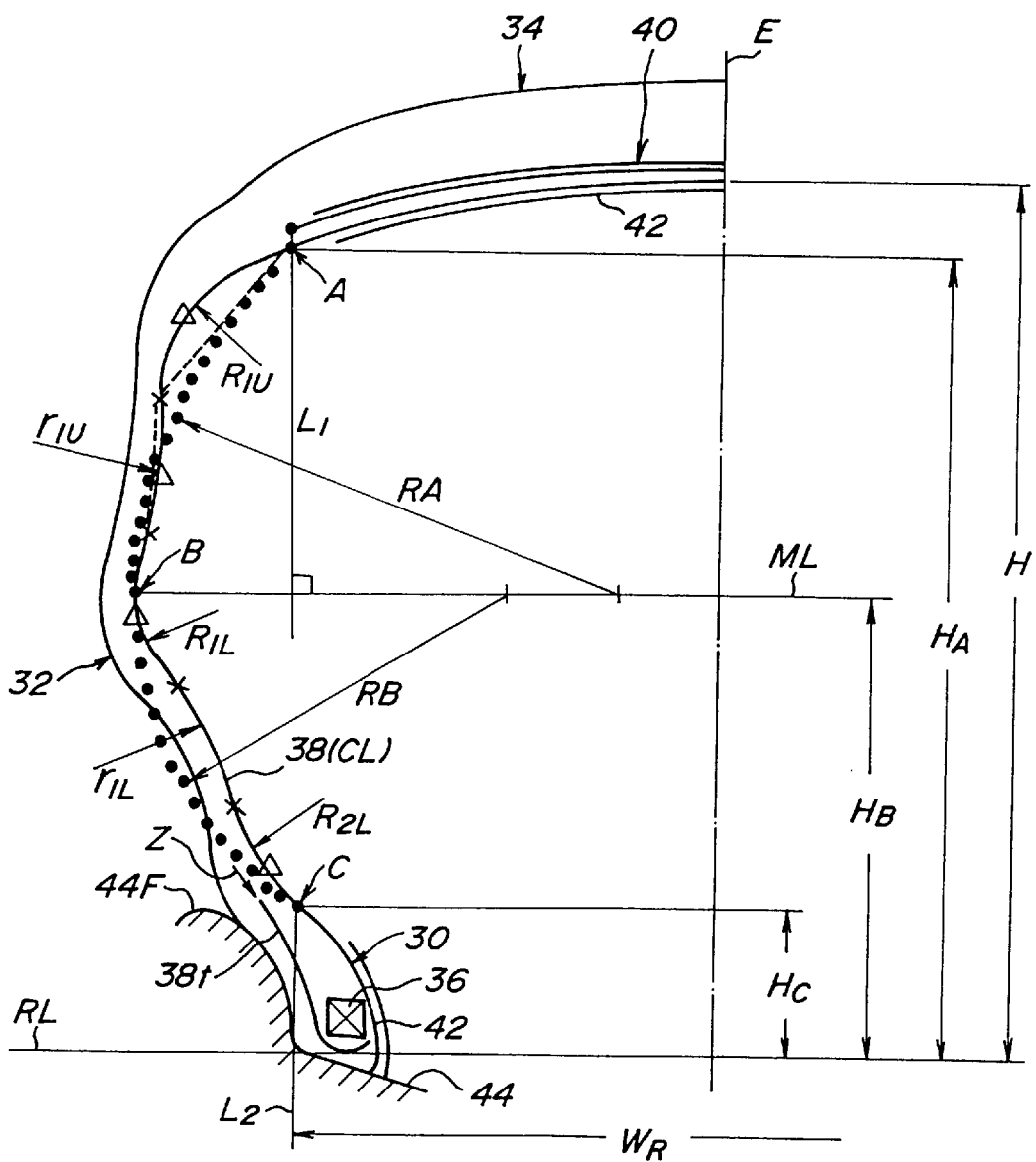
FIG. 2 is a diagrammatically radial half-section view of a second embodiment of the pneumatic radial tire according to the invention.

In FIG. 2 is shown a second embodiment of the pneumatic radial tire according to the invention. That is, the above-defined organic fiber cords are used in the carcass ply of this tire having the same structure as described in the aforementioned JP-A-4-317802, whereby the steering stability and ride comfortability are improved in addition to the improvement of durability and uniformity.

The tire shown in FIG. 2 comprises a pair of bead portions 30, a pair of sidewall portions 32, a tread portion 34, a radial carcass 38 extending between a pair of bead cores 36 embedded in the bead portions 30 and comprised of at least one carcass ply containing the above organic fiber cords (one ply in the illustrated embodiment), and a belt 40 superimposed about a crown portion of the carcass 38 and comprised of at least two laminated belt layers for reinforcing the tread portion 34 (two layers in the illustrated embodiment). Moreover, at least one ply of the carcass 38 is wound around the bead core 36 from inside of the tire toward outside to form a turnup portion 38t. The tire is further provided with an innerliner 42, a part of which is not shown in FIG. 2.

Numeral 44 is a rim adaptable to this tire and having a rim width corresponding to a tire size defined in JATMA YEAR BOOK, a part of an outer profile of which rim is shown in FIG. 2. When the tire is closely mounted onto the rim 44 and inflated under a nominal internal pressure under no load, the tire-wheeled rim assembly takes a self-posture shown in FIG. 2 at section in the radial direction of the tire.

The carcass 38 has a carcass profile line CL as shown in FIG. 2 at the self-posture state. This carcass profile line CL has 2 or more inflection points (two points in the illustrated embodiment, shown by symbol x) between an intersecting point A of a line segment $L_1$ passing through an end of a maximum width of the belt 40 (belt layer adjacent to the carcass 38 in the illustrated embodiment) and perpendicular to a rotating axis of the tire (not shown) with respect to the carcass profile line CL and a point B of a line segment ML extending in parallel with the rotating axis of the tire and existing on the carcass profile line at a position corresponding to a maximum width of the carcass 38.

Also, the carcass profile line CL has two or more inflection points (two points in the illustrated embodiment, shown by symbol x) between the point B and an intersecting point C of a line segment $L_2$ passing through a width position $W_R$ defined by a rim flange 44F of the rim 44 and perpendicular to the rotating axis of the tire and existing on the carcass profile line CL.

The carcass 38 has at least one meandering curved shape selected from consisting of a meandering curved shape having two or more inflection points between the intersecting point A and the point B on the carcass profile line CL and a meandering curved shape having two or more inflection points between the point B and the intersecting point C. In the illustrated embodiment, the carcass 38 has both the above meandering curved shapes.

In the tire of FIG. 2, it is desirable that ratios of $H_A/H$, $H_B/H$ and $H_C/H$ are within ranges of 0.80–1.10, 0.35–0.70 and 0.10–0.25, respectively, wherein $H_A$, $H_B$ and $H_C$ are heights of the intersecting point A, point B and intersecting point C measured from a rim diameter line RL (parallel to the rotating axis of the tire), respectively, and H is a maximum height of the carcass 38 measured from the rim diameter line RL.

A radius of an arc having a center on the line segment ML and passing through the intersecting point A and the point B (shown by a series of dots •) is RA, and a radius of an arc having a center on the line segment ML and passing through the point B and the intersecting point C shown by a series of dots •) is RB. Further, when points on the carcass profile line CL most separated from a line segment connecting the intersecting point A or the point B to the inflection point x (shown by dotted lines) and a line segment connecting adjacent inflection points x to each other (shown by broken line) are shown by symbol Δ, there are considered arcs passing through the intersecting point A, point Δ and inflection point x, through the point B, point Δ and inflection point x, and through adjacent inflection points x and point Δ.

Among these arcs, a radius of an arc having a center toward the inside of the tire and the point Δ positioned toward the belt 40 with respect to the line segment ML is represented by $R_i$ (i=1, 2, ..., n). Then, a radius of an arc having a center toward the inside of the tire and the point Δ positioned toward the nominal rim 44 with respect to the line segment ML is represented by $R_{iL}$=(i=1, 2, ..., n). On the other hand, a radius of an arc having a center toward the outside of the tire and the point Δ position toward the belt 40 with respect to the line segment ML is represented by $r_{iU}$ (i=1, 2, ..., m), and a radius of an arc having a center toward the outside of the tire and the point Δ positioned toward the nominal rim 44 with respect to the line segment ML is represented by $r_{iL}$=(i=1, 2, ..., m).

It is preferable that the radii $R_{iL}$, $R_{iU}$, $r_{iL}$, $R_{iU}$, RA and RB satisfy the following relationships (9)–(12):

$$0.1 < R_{iU}/RA < 0.7 (i=1, 2, \ldots, n) \quad (9)$$

$$0.1 < R_{iL}/RB < 0.7 (i=1, 2, \ldots, n) \quad (10)$$

$$0.1 < r_{iU}/RA < 1.0 (i=1, 2, \ldots, m) \quad (11)$$

$$0.1 < r_{iL}/RB < 1.0 (i=1, 2, \ldots, m) \quad (12)$$

In the self-posture at the nominal internal pressure (100%) under no load, the steering stability and ride comfortability can be improved by adopting the carcass profile line CL having 2 or more inflection points between the intersecting point A and the point B and/or between the point B and the intersecting point C without changing the conventional tire structure and newly adding or changing the reinforcing members or the like in the tread portion 34 and the bead portion 30. Furthermore, tire durability can be considerably be improved as compared with the carcass profile line shown in FIG. 1. Therefore, the carcass profile line CL of FIG. 2 has greater merits in view of tire quality and productivity.

Such a peculiar carcass profile line is obtained by controlling the distribution of rubber gauge ranging from the inner wall of the mold to the carcass ply in the rotating axial direction of the tire during the tire building through vulcanization.

As previously mentioned, the cords in the carcass ply are shrunk by heat applied in the vulcanization, whereby the slackening of cords in the turnup portion of the carcass ply is closed to improve the properties in the tire product. If the slackening or disorder of cords remains in the turnup portion of the carcass ply, tire durability is extremely deteriorated.

Particularly, if it is intended to curve the carcass profile line of the carcass ply 38 extending between the bead cores 36 in accordance with the change of rubber gauge, when the radius of curvature in the carcass profile line is large, tire building is effectively carried out in accordance with the planning. When the radius of curvature is small, the degree of curving may be shifted from the shape aimed by the designer and the effect by the change of rubber gauge becomes less. In order to attain the carcass profile line in accordance with the planning even if the radius of curvature is small, therefore, it is very useful to use the organic fiber cords according to the invention in the carcass ply of the tire as shown in FIG. 2.

In the tire according to the invention, it is preferable that the turnup portion of the carcass ply has an occupying ratio $\alpha$ of cord end count satisfying the relationship (7) of $0.48 \leq \alpha \leq 0.55$. When the value of $\alpha$ is within the above range, the strength properties as the carcass ply member can sufficiently be enhanced during the steps from the formation of the green tire to the tire building through vulcanization and hence the slackening or disorder of cords in the turnup portion is effectively prevented during the tire building through vulcanization. When $\alpha$ is less than 0.48, tire durability may be degraded, while when it exceeds 0.55, the ends of the cords are contacted with each other to considerably degrade the durability.

Moreover, the term "occupying ratio $\alpha$ of cord end count" used herein means a ratio of diameter Y of cord tc to pitch X between the cords tc embedded in coating rubber Gc in FIG. 3 being a developed view of an end of the turnup portion 38t of the carcass ply 38 viewing from an arrow Z of FIG. 2 along the periphery of the tire.

And also, it is favorable that the cords used in the carcass ply are covered with a coating rubber satisfying the relationship (8) of $17 \leq M \leq 25$, wherein M is a tensile stress (kgf/cm$^2$) at a temperature of 25° C. under 50% elongation.

Even when the organic fiber cords according to the invention are applied to the carcass ply of the tire, the disorder of cords in the turnup portion can not completely be controlled and hence it is unavoidable that the height irregularity and cord slackening remains in the turnup portion. However, when the coating rubber having a high elasticity in which the tensile stress M is 17–25 kgf/cm$^2$ is applied to the cords of the carcass ply 38, stress applied to the cord ends is largely mitigated owing to the flexural strength and hardness of the coating rubber having such a high elasticity and consequently the effect of considerably improving the tire durability under use condition of a high load is particularly developed.

When the tensile stress M is less than 17 kgf/cm$^2$, the degree of mitigating stress is small and the effect of improving the durability is insufficient. When it exceeds 25 kgf/cm$^2$, the rigidity of the turnup portion 38t is too high and the input from the rim to the cord end is apt to be concentrated to rather degrade the durability.

The following examples are given in illustration of the invention and are not intended as limitations thereof.

Tires to be tested have a tire size of 185/65R14 and are produced under vulcanization conditions of 180° C. and 13 minutes and post cure inflation conditions of internal pressure of 2.5 kgf/cm$^2$ and 26 minutes, respectively.

These tires have a tire structure shown in FIG. 2 or a tire structure shown in FIG. 1. In the tires of FIG. 2, the belt 40 is comprised of two belt layers each containing steel cords of 1×5×0.23 twisting structure at an end count of 34.0 cords/5 cm, in which the cord angle of a first belt layer is 22 degrees upwards to the left with respect to the circumferential direction of the tire and the cord angle of a second belt layer is 22 degrees upward to the right with respect to the circumferential direction.

In the passenger car tires having such a structure, the carcass profile line of the carcass ply 38 has ratios of curvature of $R_{1U}/RA=0.25$, $r_{1U}/RA=0.35$, $R_{1L}/RB=0.40$, $r_{1L}/RB=0.45$ and $R_{2L}/RB=0.50$, respectively, at the self-posture state when the tire is mounted on the nominal rim and inflated at a nominal internal pressure (100%) under no load.

The tires shown in FIG. 1 have the same structure as the tire shown in FIG. 2 except for the carcass profile line.

In these tires, the carcass is comprised of a single carcass ply, in which polyethylene terephthalate fiber (hereinafter abbreviated as PET) is used as a material for the cord in the carcass ply of the tire other than the tires of Comparative Examples 8 and 9. That is, aramide fiber (made by DuPont, Kevlar) is used in Comparative Example 8 and nylon fiber (type 728, made by DuPont) is used in Comparative Example 9. Moreover, all of the cords used in all of these tires have a twist coefficient of 0.7 and a twisting structure of cable twist of 39 turns/10 cm and ply twist of 39 turns/10 cm.

In the carcass ply, PET cords of 1500 d/2, aramide fiber cords of 1500 d/2 or nylon fiber cords of 1260 d/2 are arranged at a cord angle of 90° with respect to the equatorial plane of the tire and used at an occupying ratio of cord end count as shown in Table 1.

The PET cord is produced as follows.

At first, a raw yarn of PET is spun by quenching polyester solid phase polymerized polymer through a spinneret in a gas atmosphere of 10–60° C. under usual conditions in a spinning factory. In this case, the spinning rate is selected within a range of 2000–6000 m/min and the drawing ratio is selected within a range of 1.05–2.40. Then, the thus obtained raw yarns are cable-twisted and then ply-twisted to form PET twisted cords in a cord manufacturing factory.

The thus twisted cords are subjected to a dipping treatment under the following conditions in order to improve the adhesion to rubber.

The cords are immersed in a resorcin-formalin-latex solution and then dried in a drying zone at a temperature of 170° C. for a time of 60–160 seconds, in a heat set zone at a temperature of 180–260° C. under a cord tension of 0.05–1.80 g/d for a time of 20–160 seconds and in a normalizing zone at a temperature of 180–260° C. under a cord tension of 0.01–0.10 g/d for a time of 20–160 seconds.

In this way, there are obtained PET cords having the aforementioned properties.

The properties of the cord are evaluated as follows.

Dry heat shrinkage factors S1 and S2 of cord

First, the length of the cord is measured before heat shrinkage. Then, the cord is thermally shrunk by leaving to stand in an oven held at 177° C. under a load of 0.03 g/d or 0.10 g/d for 30 minutes to measure a length of the shrunk cord. The dry heat shrinkage factor S1 or S2 is calculated by using the measured values according to the following equation:

Dry heat shrinkage factor={(cord length before heat shrinkage−cord length after heat shrinkage)/cord length before heat shrinkage}×100(%)

Middle elongation of cord

An elongation under a load of 2.25 g/d is read by depicting so-called load-elongation curve by means of an autograph according to a test method of JIS L1017 for "elongation under constant load".

The tensile stress of the coating rubber is measured as follows.

A specimen of dumb-bell shape No. 3 is cut out from a sheet of rubber sample cured at 177° C. for 20 minutes according to JIS K6301 and then subjected to a tension test according to JIS K6301 to depict a tensile stress-elongation curve, from which the tensile stress M at 50% elongation is measured.

Tire performances are evaluated with respect to all of the tires having a tire structure shown in Table 1 as follows:

Tire uniformity (RFV value)

It is judged that the better the uniformity, the better the dimensional stability. The RFV value of the uniformity is measured according to a test method for the uniformity of automobile tire defined in JASO C607. In this case, the RFV value of not less than 7.0 kg is "bad", and that of less than 7.0 kg but not less than 5.0 kg is "good", and that of less than 5.0 kg is "excellent", and that of not more than 3.0 kg is "very excellent". The better the RFV value, vibrations or the like are not caused during the running of the tire, and when the value is less than 5.0 kg, the body sensibility becomes excellent. Moreover, when the RFV value is less than 7.0 kg but not less than 5.0 kg, the improvement of the dimensional stability is indistinguishable in the feeling test by amateur drivers but may not be attained in the feeling test by professional drivers.

Steering stability and ride comfortability

A tire to be tested is mounted onto a vehicle and actually run on a test course at a speed of 60–200 km/h by two professional drivers, during which the steering stability inclusive of straight running stability, cornering stability, handling and the like and the ride comfortability are evaluated by the feeling of the driver. Each of these properties is represented by an index on the basis that the conventional example is 100. The larger the index value, the better the property. Particularly, the index value of not less than 102, preferably not less than 103 exhibits the improvement of the property.

Sidewall appearance

A tire to be tested is inflated under an internal pressure of 2.0 kgf/cm$^2$ and left to stand in a room of 25±2° C. for 24 hours and again inflated under an internal pressure of 2.0 kgf/cm$^2$. In this state, the unevenness of the outer surface in the sidewall portion is measured at a position corresponding to a maximum tire width over a full periphery in the circumferential direction of the tire by means of a surface roughness measuring machine. When the measured value exceeds 0.5 mm, the unevenness of sidewall portion may visually be observed to come into problem in the sidewall appearance.

Durability of tire

A tire to be tested is mounted onto a rim of 5.5J-14 under a maximum internal pressure according to JATMA standard at an atmosphere temperature of 30±3° C. and run on a smooth steel drum having a diameter of 1.7 m under a load corresponding to 2 times of a standard value according to JATMA standard, during which a running distance until the occurrence of trouble is measured. Tire durability is represented by an index on the basis that the running distance of the conventional example is 100. The larger the index value, the better the durability.

The measured results are shown in Table 1.

TABLE 1(a)

| | | Example | | | | | | | Conventional |
|---|---|---|---|---|---|---|---|---|---|
| | | 1 | 2 | 3 | 4 | 5 | 6 | 7 | Example |
| Cord for carcass ply | Material | PET | PET | PET | PET | PET | PET | PET | PET |
| | Heat shrinkage factor S1 (%) | 2.5 | 2.6 | 2.5 | 2.6 | 2.8 | 2.8 | 3.8 | 3.2 |
| | Heat shrinkage factor S2 (%) | 0.2 | 0.4 | 0.3 | 0.4 | 0.4 | 0.7 | 1.5 | 1.5 |
| | (S1-2.0) value | 0.5 | 0.6 | 0.5 | 0.6 | 0.8 | 0.8 | 1.8 | 1.2 |
| | Middle elongation (%) | 6.1 | 6.0 | 5.1 | 4.8 | 4.8 | 4.6 | 3.8 | 3.8 |
| Tire structure | | FIG. 1 | FIG. 1 | FIG. 2 | FIG. 2 | FIG. 2 | FIG. 2 | FIG. 2 | FIG. 1 |
| Occupying ratio of cord end count (%) | | 0.47 | 0.47 | 0.47 | 0.48 | 0.47 | 0.50 | 0.53 | 0.46 |
| Tensile stress M of rubber (kgf/cm$^2$) | | 16.0 | 16.5 | 16.0 | 16.5 | 17.0 | 17.0 | 21.0 | 13.5 |
| Tire performances | Uniformity | very excellent | very excellent | very excellent | very excellent | very excellent | excellent | good | good |
| | Ride comfortability (index) | 105 | 103 | 115 | 113 | 113 | 110 | 108 | 100 |

TABLE 1(a)-continued

|  |  | Example |  |  |  |  |  |  | Conventional |
|--|--|--|--|--|--|--|--|--|--|
|  |  | 1 | 2 | 3 | 4 | 5 | 6 | 7 | Example |
|  | Steering stability (index) | 103 | 101 | 110 | 109 | 109 | 107 | 107 | 100 |
|  | Sidewall appearance | 0.52 | 0.50 | 0.45 | 0.44 | 0.44 | 0.42 | 0.38 | 0.38 |
|  | Durability (index) | 100 | 100 | 100 | 115 | 110 | 120 | 125 | 100 |

$S2 \leq S1 - 2.0$

TABLE 1(b)

|  |  | Comparative Example |  |  |  |  |  |  |  |  |
|--|--|--|--|--|--|--|--|--|--|--|
|  |  | 1 | 2 | 3 | 4 | 5 | 6 | 7 | 8 | 9 |
| Cord for carcass ply | Material | PET | PET | PET | PET | PET | PET | PET | Kevlar | nylon |
|  | Heat shrinkage factor S1 (%) | 2.0 | 2.4 | 2.4 | 2.5 | 2.7 | 3.2 | 5.1 | 0.2 | 6.0 |
|  | Heat shrinkage factor S2 (%) | 0.3 | 0.6 | 0.4 | 0.8 | 1.0 | 1.5 | 3.2 | 0.0 | 4.2 |
|  | (S1-2.0) value | 0.0 | 0.4 | 0.4 | 0.5 | 0.7 | 1.2 | 3.1 | -1.8 | 4.0 |
|  | Middle elongation (%) | 5.1 | 4.7 | 4.7 | 4.5 | 4.2 | 3.8 | 1.8 | 0.8 | 7.0 |
| Tire structure |  | FIG. 2 | FIG. 2 | FIG. 1 | FIG. 1 | FIG. 1 | FIG. 1 | FIG. 1 | FIG. 1 | FIG. 1 |
| Occupying ratio of cord end count (%) |  | 0.45 | 0.48 | 0.48 | 0.50 | 0.55 | 0.57 | 0.46 | 0.45 | 0.45 |
| Tensile stress M of rubber (kgf/cm$^2$) |  | 16.0 | 16.5 | 16.5 | 17.0 | 18.0 | 25.0 | 13.5 | 16.0 | 16.0 |
| Tire performances | Uniformity | very excellent | excellent | very excellent | good | good | good | bad | very excellent | bad |
|  | Ride comfortability (index) | 115 | 112 | 103 | 102 | 101 | 100 | 95 | 105 | 92 |
|  | Steering stability (index) | 110 | 108 | 101 | 100 | 100 | 100 | 92 | 103 | 90 |
|  | Sidewall appearance | 0.45 | 0.43 | 0.43 | 0.41 | 0.40 | 0.38 | 0.33 | 0.30 | 0.56 |
|  | Durability (index) | 75 | 88 | 88 | 100 | 100 | 100 | 100 | 65 | 100 |

As mentioned above, the use of the organic fiber cords for rubber reinforcement according to the invention can largely improve the durability and dimensional stability of the rubber article without exerting upon the properties of the rubber article.

Further, when the organic fiber cords according to the invention are applied to the carcass ply of the pneumatic radial tire, the tire uniformity and durability are improved. Particularly, when the carcass profile line of such a radial tire is changed into a particular shape as disclosed in JP-A-4-317802, the steering stability and ride comfortability are further improved in addition to the sidewall appearance and rim durability.

What is claimed is:

1. A pneumatic radial tire comprising; a tread portion, a pair of sidewall portions extending inward from both ends of the tread portion, a pair of bead portions extending from the sidewall portions, a radial carcass comprised of one or more carcass plies of organic fiber cords, said carcass toroidally extending between the bead portions in which at least one carcass ply is wound around a bead core embedded in the bead portion from inside of the tire toward outside to form a turnup portion, and a belt superimposed about a crown portion of the carcass and comprised of plural belt layers, wherein said organic fiber cords satisfy the following relationships:

$S1 \geq 2.5$ $S2 \leq 1.8$ where S1 is a dry heat shrinkage factor in percent at a temperature of 177° C. under a load of 0.03 g/d and S2 is a dry heat shrinkage factor in percent at a temperature of 177° C. under a load of 0.10 g/d.

2. A pneumatic radial tire according to claim 1, wherein said cord has a middle elongation E at a temperature of 25° C. under a load of 2.25 g/d satisfying the following relationship:

$E \leq 6.0$.

3. A pneumatic radial tire according to claim 1, wherein said dry heat shrinkage factor S2 satisfies the following relationship:

$S2 \leq 0.7$.

4. A pneumatic radial tire according to claim 1, wherein said cord is made from polyester.

5. A pneumatic radial tire according to claim 1, wherein said cord is subjected to a treatment with an adhesive under dipping conditions that a temperature of a final normalizing zone is made lower by 40–80° C. than a temperature of a heat set zone and a cord tension in the normalizing zone is ½–⅕ of cord tension in the heat set zone.

6. A pneumatic radial tire according to claim 1, wherein in each sidewall portion said carcass has a carcass profile line at section in a radial direction of the tire made from at least one meandering curved shape selected from the group consisting of a meandering curved shape having two or more inflection points between an intersecting point A of a line segment passing through an end of a maximum width of the belt and perpendicular to a rotating axis of the tire with respect to the carcass profile line and a point B existing on the carcass profile line at a position corresponding to a maximum width of the carcass and a meandering curved shape having two or more inflection points between the point B and an intersecting point C of a line segment passing through a width position of a rim and perpendicular to the rotating axis of the tire when the tire is mounted onto a nominal rim and self-postured by inflating at a standard internal pressure no load.

7. A pneumatic radial tire according to claim 1, wherein said turnup portion of the carcass has an occupying ratio $\alpha$ of cord end count defined by a ratio of cord diameter to cord pitch between adjacent cords satisfying the following relationship:

$$0.48 \leq \alpha \leq 0.55.$$

8. A pneumatic radial tire according to claim 1, wherein said cord used in the carcass is covered with a coating rubber satisfying the following relationship:

$$17 \leq M \leq 25$$

wherein M is a tensile stress in $kgf/cm^2$ at a temperature of 25° C under 50% elongation.

* * * * *